United States Patent
Shimizu et al.

(10) Patent No.: US 8,479,513 B2
(45) Date of Patent: Jul. 9, 2013

(54) CONTROL DEVICE FOR DRIVE UNIT OF ROTARY MOTOR FOR ELECTRICALLY ASSISTED TURBOCHARGER

(75) Inventors: Masahiro Shimizu, Koto-ku (JP); Yasuyuki Shibui, Koto-ku (JP)

(73) Assignee: IHI Corporation, Tokyo (JP)

( * ) Notice: Subject to any disclaimer, the term of this patent is extended or adjusted under 35 U.S.C. 154(b) by 1016 days.

(21) Appl. No.: 12/524,619

(22) PCT Filed: Feb. 5, 2008

(86) PCT No.: PCT/JP2008/051829
§ 371 (c)(1), (2), (4) Date: Jul. 27, 2009

(87) PCT Pub. No.: WO2008/096734
PCT Pub. Date: Aug. 14, 2008

(65) Prior Publication Data
US 2009/0320468 A1    Dec. 31, 2009

(30) Foreign Application Priority Data

Feb. 8, 2007    (JP) ................................. 2007-029529

(51) Int. Cl.
*F02B 33/44* (2006.01)
(52) U.S. Cl.
USPC .............................................. 60/608; 60/607
(58) Field of Classification Search
USPC ........................................... 60/608, 597, 598
See application file for complete search history.

(56) References Cited

U.S. PATENT DOCUMENTS

| | | | |
|---|---|---|---|
| 6,609,375 B2 * | 8/2003 | Allen et al. | 60/608 |
| 7,530,229 B2 * | 5/2009 | Akita | 60/608 |
| 2003/0005695 A1 * | 1/2003 | Allen et al. | 60/608 |
| 2003/0051475 A1 * | 3/2003 | Allen et al. | 60/608 |
| 2003/0110770 A1 | 6/2003 | Criddle et al. | |
| 2005/0242760 A1 | 11/2005 | Fujita et al. | |
| 2006/0260304 A1 | 11/2006 | Ishiwatari | |
| 2008/0148730 A1 * | 6/2008 | Akita | 60/608 |

FOREIGN PATENT DOCUMENTS

| | | |
|---|---|---|
| DE | 102 23 810 A1 | 12/2003 |
| DE | 10 2006 000 072 A1 | 10/2006 |
| EP | 1 300 559 A1 | 4/2003 |
| JP | 6 193945 | 7/1994 |
| JP | 6 280594 | 10/1994 |

(Continued)

OTHER PUBLICATIONS

Machine Translation of JP-07019063, Katsumi Terauchi et al, Jan. 20, 1995, p. 1-5.*

*Primary Examiner* — Mary A Davis
(74) *Attorney, Agent, or Firm* — Oblon, Spivak, McClelland, Maier & Neustadt, L.L.P.

(57) ABSTRACT

A driver (41) for driving a rotary motor (20) directly connected to a rotating shaft member of a supercharger is mounted on a board (39) together with a control device (51) and a heat sink (39*a*) and is housed in an engine room. Even when a temperature (ambient temperature) in the engine room detected by a temperature sensor (47*b*) rises up to an upper limit temperature (upper limit ambient temperature) of the ambient temperature, if a temperature (driver temperature) of a portion of the driver (41) that has a highest temperature detected by a temperature sensor (47*a*) is yet to rise to an upper limit temperature (upper limit internal temperature) of the driver temperature, the control device (51) causes the rotary motor (20) to continue to drive as the motor while lowering an upper limit of an output current.

2 Claims, 6 Drawing Sheets

FOREIGN PATENT DOCUMENTS

| | | |
|---|---|---|
| JP | 7-19063 | 1/1995 |
| JP | 11 341884 | 12/1999 |
| JP | 2003 284375 | 10/2003 |
| JP | 2005 168262 | 6/2005 |

* cited by examiner

| DRIVER TEMPERATURE | AMBIENT TEMPERATURE | UPPER LIMIT OUTPUT CURRENT |
|---|---|---|
| LOW | LOW | 90A |
| LOW | HIGH | 63A |
| HIGH | LOW | 0A |
| HIGH | HIGH | |

CONTROL DEVICE FOR DRIVE UNIT OF ROTARY MOTOR FOR ELECTRICALLY ASSISTED TURBOCHARGER

TECHNICAL FIELD

The present invention relates to a control device for a drive unit for driving a rotary motor for electric assistance directly connected to a rotating shaft of a turbocharger disposed in intake and exhaust passages of an engine.

BACKGROUND ART

A turbocharger used for improving fuel efficiency of a vehicle compresses combustion air by use of a compressor and supplies the compressed air to an internal-combustion engine. The compressor is driven by rotating a turbine coaxial with the compressor by use of exhaust gas energy in the internal-combustion engine.

In such a turbocharger, the compressor does not sufficiently compress the combustion air at startup of the vehicle or during running of the vehicle in a low speed range of the internal-combustion engine. As a result, a boost pressure of the combustion air supplied to the internal-combustion engine tends to be insufficient. Such an insufficient boost pressure of the combustion air is attributable to a shortage of exhaust gas energy to rotate the turbine and the compressor, the shortage resulting from a small amount of exhaust gas at startup of the vehicle or during running of the vehicle in the low speed range of the internal-combustion engine.

In order to solve the above problem, there has been proposed a technique of eliminating the insufficiency of the boost pressure of the combustion air described above by employing an electrically assisted method. This electrically assisted method is for supplementing compressor driving power by an amount equivalent to a shortfall in exhaust gas energy by driving a rotary motor directly connected to a rotating shaft connecting a turbine to the compressor. The above technique is disclosed in a brochure of Japanese Patent No. 3203869 (Patent Document 1), for example. The rotary motor of this kind is driven by a drive circuit, which supplies power by converting a direct current power supply from a battery into an alternating current, or a driver (driver module) of the drive circuit.

Since a large current that meets the rating of the rotary motor flows through the drive circuit described above, circuit elements in the drive circuit generate a considerable amount of heat. Moreover, since the drive circuit and the driver thereof are generally disposed in a space such as an engine room close to the turbocharger, a temperature around the circuit and the driver is increased by heat emitted from the engine. Consequently, in order to protect the drive circuit and the driver from the heat, it is important to monitor temperatures of the drive circuit and the driver themselves as well as their ambient temperature and to manage operations of the drive circuit and the driver according to the temperatures.

Hence, there have heretofore been taken measures including: individually monitoring the temperatures of the drive circuit and the driver themselves and the temperature in the space where the drive circuit and the driver are disposed; and stopping the drive of the rotary motor when any one of the temperatures reaches an upper limit temperature that is considered to influence the operations of the drive circuit and the driver.

Such conventional control for the drive of the rotary motor of the turbocharger leads to the following situation. Specifically, for example, once the temperature in the space where the drive circuit and the driver are disposed reaches the upper limit temperature, the drive of the rotary motor is stopped. Then, even if the temperatures of the drive circuit and the driver are below the upper limit temperature, the drive of the rotary motor cannot be restarted unless the temperature in the space where the drive circuit and the driver are disposed drops below the upper limit temperature. Such conventional control leads to overprotection of the drive circuit and the driver and could be a factor that inhibits the rotary motor from sufficiently exerting its essential function to electrically assist the turbocharger.

The present invention was made in consideration of the foregoing circumstances. It is an object of the present invention to provide a control device for a drive unit of a rotary motor for an electrically assisted turbocharger, the control device being capable of providing electric assistance of the turbocharger by drive of the rotary motor and achieving thermal protection of the drive unit in a well balanced manner in the case where the rotary motor for the electrically assisted turbocharger is driven by the drive unit including the drive circuit and the driver.

DISCLOSURE OF THE INVENTION

In order to achieve the above object, an aspect of the present invention is a control device for controlling operations of a drive unit configured to drive a rotary motor for an electrically assisted turbocharger, the rotary motor being directly connected to a rotating shaft of the turbocharger disposed in intake and exhaust passages of an engine and being driven according to an operating state of the engine, the device comprising: internal temperature detection means for detecting a temperature of the drive unit; ambient temperature detection means for detecting an ambient temperature in a space where the drive unit is disposed; and control means for controlling drive of the rotary motor by the drive unit based on results of detections by the internal temperature detection means and the ambient temperature detection means, wherein (a) the control means stops the drive of the rotary motor by the drive unit when the temperature of the drive unit is above a preset upper limit internal temperature, and (b) when the temperature of the drive unit is below the upper limit internal temperature, the control means allows the drive of the rotary motor by the drive unit up to 100% output (b1) when the ambient temperature in the space where the drive unit is disposed is below a preset upper limit ambient temperature, and limits the drive of the rotary motor by the drive unit to an output of a predetermined percentage above 0% and below 100% (b2) when the ambient temperature is above the upper limit ambient temperature.

In the control device for the drive unit of the rotary motor for the electrically assisted turbocharger according to the present invention described in the above aspect, the temperature of the drive unit itself is detected by the internal temperature detection means and the ambient temperature in the space where the drive unit is disposed is detected by the ambient temperature detection means.

While the temperature of the drive unit itself is above the preset upper limit internal temperature, the drive of the rotary motor by the drive unit is stopped regardless of whether or not the ambient temperature in the space where the drive unit is disposed is below the preset upper limit ambient temperature. Therefore, the drive unit is surely protected from heat.

On the other hand, while the temperature of the drive unit itself is below the upper limit internal temperature, the drive of the rotary motor by the drive unit is executed. However, if the ambient temperature in the space where the drive unit is disposed is above the preset upper limit ambient temperature, the drive of the rotary motor by the drive unit is limited to an output of a predetermined percentage above 0% and below 100%. While the ambient temperature in the space where the drive unit is disposed is below the upper limit ambient temperature, the drive of the rotary motor by the drive unit is allowed up to 100% output. This prevents a situation where the drive of the rotary motor by the drive unit is stopped because the ambient temperature in the space where the drive unit is disposed is above the upper limit ambient temperature even though the temperature of the drive unit itself is below the upper limit internal temperature. Therefore, the drive unit is not overprotected from the heat. Specifically, the electric assistance of the turbocharger by the drive of the rotary motor is continued with the output within a range in which the drive unit can be protected from the heat at a necessary level.

Thus, in driving the rotary motor for the electrically assisted turbocharger by the drive unit, thermal protection of the drive unit can be appropriately performed while trying as much as possible not to interfere with the electric assistance of the turbocharger by the drive of the rotary motor.

BEST MODE FOR CARRYING OUT THE INVENTION

With reference to the drawings, description will be given below of an electrically assisted turbocharger including a rotary motor of which drive is controlled by a control device according to an embodiment of the present invention.

Figure 1:
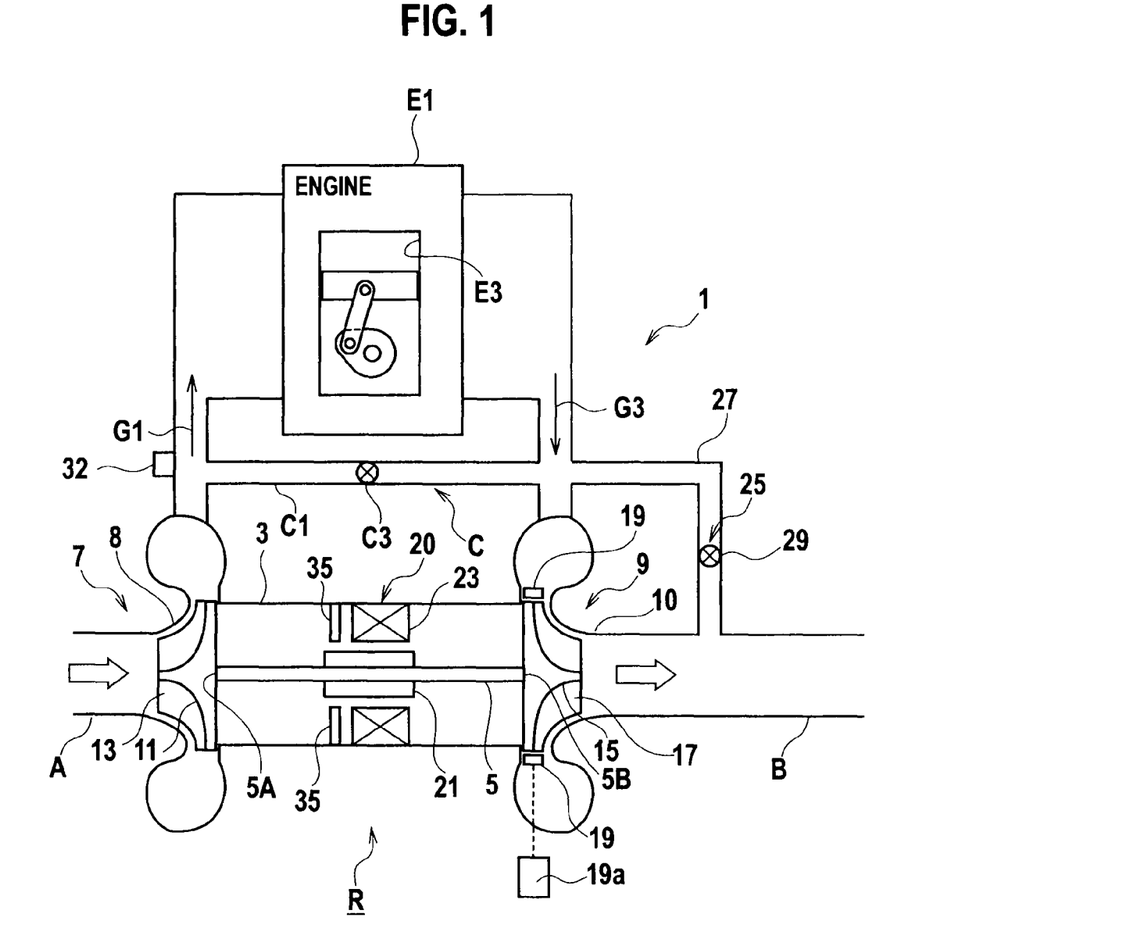
FIG. 1 is an explanatory diagram showing a schematic configuration of an electrically assisted turbocharger including a rotary motor of which drive is controlled by a control device according to an embodiment of the present invention.

FIG. 1 is an explanatory diagram showing a schematic configuration of the electrically assisted turbocharger including the rotary motor of which drive is controlled by the control device according to the embodiment of the present invention.

Reference numeral E1 in FIG. 1 is an engine, which combusts a fuel inside a combustion chamber E3 by use of combustion air G1 supplied from an intake pipe A through an unillustrated intake manifold and discharges resultant exhaust gas G3 to an exhaust pipe B through an unillustrated exhaust manifold. The engine E1, the intake pipe A and the exhaust pipe B are housed in an engine room R of a vehicle together with the unillustrated intake manifold and exhaust manifold.

An exhaust gas recirculation system C is attached to the engine E1. The exhaust gas recirculation system C includes: an exhaust gas recirculation pipe C1 serving as a shortcut connecting the exhaust pipe B and the intake pipe A; and a flow control valve C3 provided in the middle of the exhaust gas recirculation pipe C1. A flow rate of the exhaust gas G3 recirculated to the intake pipe A from the exhaust pipe B through the exhaust gas recirculation pipe C1 is controlled by changing an opening of the flow control valve C3.

The exhaust gas recirculation system C recirculates an appropriate amount of the exhaust gas G3 to the intake pipe A from the exhaust pipe B, thereby lowering an oxygen concentration inside the engine E1 to recirculate nitrogen oxides (NOx) to the engine E1. Thus, a combustion temperature inside the combustion chamber E3 of the engine E1 is lowered. As a result, generation of the nitrogen oxides can be further suppressed.

Moreover, reference numeral 1 in FIG. 1 denotes a turbocharger attached to the internal-combustion engine with the exhaust gas recirculation system described above. This turbocharger 1 is housed in the engine room R together with the engine E1 and the exhaust gas recirculation system C. The turbocharger 1 includes: a housing 3; a rotating shaft member (equivalent to a rotating shaft in claims) 5 which is rotated inside the housing 3; a centrifugal compressor (hereinafter abbreviated as "compressor") 7 which is provided on one end portion 5A of the rotating shaft member 5; and a centrifugal turbine (hereinafter abbreviated as "turbine") 9 which is provided on the other end portion 5B of the rotating shaft member 5. The rotating shaft member 5 is rotatably supported on the housing 3 via a fluid dynamic bearing (not shown), for example.

The compressor 7 includes a compressor housing 8 and a compressor impeller 11 housed in the compressor housing 8. The compressor housing 8 is provided at a spot on an upstream side, in a flow of the combustion air G1, of the junction of the intake pipe A and the exhaust gas recirculation pipe C1. The compressor impeller 11 includes a compressor disk 12 and a blade 13. A base end portion of the compressor disk 12 is integrally connected to the one end portion 5A of the rotating shaft member 5. The blade 13 is integrally provided on a distal end portion of the compressor disk 12.

The turbine 9 includes: a turbine housing 10; and a turbine impeller 15 and a plurality of variable vanes 19, 19, . . . , which are housed in the turbine housing 10. The turbine housing 10 is provided at a spot on a downstream side, in a flow of the exhaust gas G3, of the branch point of the exhaust pipe B and the exhaust gas recirculation pipe C1. The turbine impeller 15 includes a turbine disk 16 and a blade 17. A base end portion of the turbine disk 16 is integrally connected to the other end portion 5B of the rotating shaft member 5. The blade 17 is integrally provided on a distal end portion of the turbine disk 16.

The variable vanes 19 are arranged on an outer circumference of the turbine impeller 15 so as to be equally spaced apart from each other in a circumferential direction. The variable vanes 19 are connected to an inner wall of the turbine housing 10 in such a manner that angles thereof can be adjusted. Moreover, the variable vanes 19 are connected to each other by an unillustrated link mechanism. Furthermore, mounting angles of the variable vanes 19 on the turbine housing 10 can be collectively adjusted by power of a stepping motor 19a connected to the link mechanism.

In order to resolve, in an assisting manner, insufficient boost pressure of the combustion air G1 due to insufficient gas pressure of the exhaust gas G3, the angles of the variable vanes 19 described above are adjusted so as to narrow the intervals between the adjacent variable vanes 19 and 19. Accordingly, a throttling effect of the exhaust gas G3 passing between the adjacent variable vanes 19 and 19 is increased and thus a spraying speed of the exhaust gas G3 onto the blade 17 of the turbine impeller 15 is increased. Consequently, a rotation speed of the turbine disk 16 is increased and a rotation speed of the compressor disk 12 of the compressor 7 is also increased. Thus, a boost pressure of the combustion air G1 compressed by the blade 13 of the compressor impeller 11 is increased.

Moreover, a rotary motor 20 is directly connected to the turbocharger 1. In this embodiment, the rotary motor 20 is formed of a three-phase AC motor. Specifically, a permanent magnet synchronous motor (PMSM) is used. The rotary motor 20 includes: a rotor 21 attached to the rotating shaft member 5; and a three-phase stator 23 which is attached to an inner wall of the housing 3 and faces the rotor 21.

In the rotary motor 20, a direct current from a battery Batt (see FIG. 2) of the vehicle is converted into a three-phase alternating current by a driver 41 (see FIG. 2) to be described later. Moreover, the three-phase alternating current is allowed to flow through a coil of each phase of the stator 23. Accordingly, the rotor 21 is rotated to rotate the rotating shaft member 5. Thus, the rotary motor 20 functions as a motor in a power running mode.

Moreover, in the rotary motor 20, when the rotor 21 is rotated together with the rotating shaft member 5, an induced current flows through the unillustrated wound coil of each phase of the stator 23. Then the induced current flowing through the coil of each phase is converted from the three-phase alternating current into the direct current by the driver 41 and then charged in the battery Batt. Thus, the rotary motor 20 functions as a power generator in a regeneration mode.

Note that the driver 41 includes circuit elements on a board 39 disposed in the engine room R as in the case of the turbocharger 1. Moreover, reference numeral 35 in FIG. 1 denotes a hall sensor that constitutes a rotation speed sensor of the rotary motor 20.

Furthermore, a waste gate 25 is provided in the turbocharger 1. This waste gate 25 is formed in a bypass pipe 27 which bypasses the turbine 9 in the middle of the exhaust pipe B. A flow rate of the exhaust gas G3 bypassing the turbine 9 through the waste gate 25 and the bypass pipe 27 is controlled by an opening of a waste gate valve 29 provided in the waste gate 25. The opening of the waste gate valve 29 is determined by a relationship between a spring constant of an unillustrated biasing spring and a gas pressure of the exhaust gas G3 applied to the waste gate valve 29.

When the gas pressure of the exhaust gas G3 supplied to the turbine 9 abnormally rises and almost exceeds the withstand pressure of the turbine 9, the waste gate 25 is opened by movement of the waste gate valve 29 against the biasing force of the unillustrated biasing spring. When the waste gate 25 is opened, the bypass pipe 27 is communicated to allow a part of the exhaust gas G3 inside the exhaust pipe B to bypass the turbine 9. Therefore, by opening the waste gate 25 by the waste gate valve 29, an upper limit of the gas pressure of the exhaust gas G3 supplied to the turbine 9 is adjusted. Thus, the gas pressure of the exhaust gas G3 supplied to the turbine 9 is prevented from abnormally rising.

Figure 2:
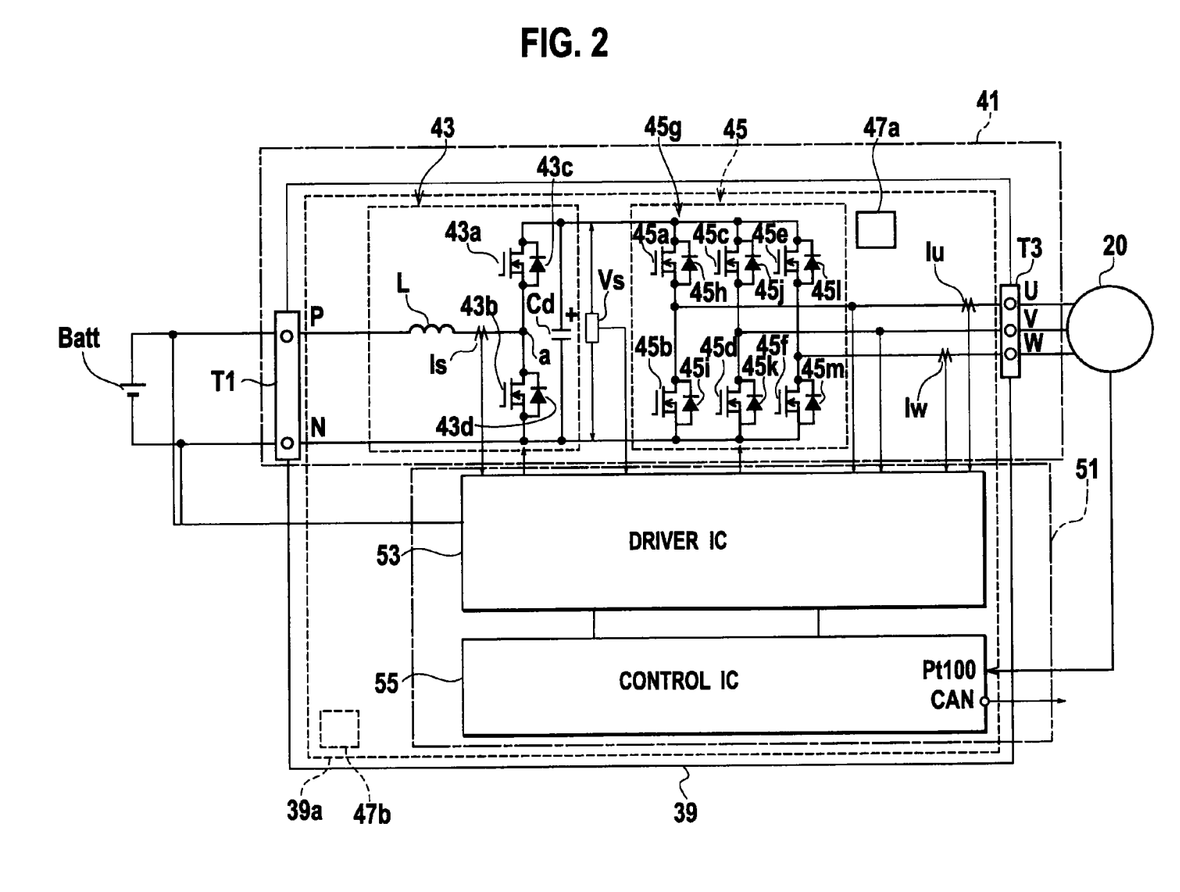
FIG. 2 is a schematic circuit diagram showing partially in blocks circuit elements on a board of a driver shown in FIG. 1.

FIG. 2 is a schematic circuit diagram showing partially in blocks the circuit elements on the board 39 of the driver 41. The driver 41 includes a step-up converter part 43, an inverter part 45, a terminal T1 for the battery Batt and a terminal T3 for the rotary motor 20.

The step-up converter part 43 includes: a series circuit of two MOS-FETs 43a and 43b as power switching devices; free wheel diodes 43c and 43d for preventing a backflow, which are connected between drains and sources of the MOS-FETs 43a and 43b, respectively; a step-up coil L having one end connected to a connection point a between the two MOS-FETs 43a and 43b; and a smoothing capacitor Cd connected in parallel to the series circuit of the two MOS-FETs 43a and 43b. Note that a positive electrode of the battery Batt is connected to the other end of the step-up coil L through the terminal T1.

In the step-up converter part 43 thus configured, the MOS-FETs 43a and 43b are alternately conducted by a switching signal alternately supplied to gates of the MOS-FETs 43a and 43b from a control module 51 (see FIGS. 2 and 3) to be described later in the power running mode of the rotary motor 20. Accordingly, a back electromotive force generated in the step-up coil L by the direct current from the battery Batt is accumulated in the smoothing capacitor Cd and also discharged. Thus, the direct current from the battery Batt is stepped up in the step-up converter part 43.

The inverter part 45 includes: a three-phase bridge circuit 45g including six MOS-FETs 45a to 45f as power switching devices; and free wheel diodes 45h to 45m for preventing a backflow, which are connected between drains and sources of the MOS-FETs 45a to 45f, respectively.

In the inverter part 45 thus configured, the MOS-FETs 45a and 45b, the MOS-FETs 45c and 45d and the MOS-FETs 45e and 45f, which correspond to the respective phases of the rotary motor 20, are alternately conducted by switching signals supplied to gates of the MOS-FETs 45a to 45f from the control module 51 in the power running mode of the rotary motor 20. Thus, the direct current from the battery Batt stepped up in the step-up converter part 43 is sequentially supplied to the coils of the respective phases of the stator 23 in the rotary motor 20 at different timings from each other through the terminal T3. Specifically, in the inverter part 45, the direct current from the battery Batt stepped up in the step-up converter part 43 is converted into a three-phase alternating current by the three-phase bridge circuit 45g.

Moreover, in the inverter part 45 described above, the MOS-FETs 45a and 45b, the MOS-FETs 45c and 45d and the MOS-FETs 45e and 45f, which correspond to the respective phases of the rotary motor 20, are alternately conducted by switching signals supplied to the gates of the MOS-FETs 45a to 45f from the control module 51 in the regeneration mode of the rotary motor 20. Thus, three-phase alternating currents inputted from the coils of the respective phases of the stator 23 in the rotary motor 20 through the terminal T3 are half-wave rectified by turning on and off the MOS-FETs 45a to 45f. Specifically, in the inverter part 45, the three-phase alternating current from the rotary motor 20 is converted into a direct current and then outputted to the step-up converter part 43. Therefore, the inverter part 45 functions as a reversible power converter (DC-AC and AC-DC) on the rotary motor 20 side.

Moreover, in the step-up converter part 43 described above, the half-wave rectified current inputted from the inverter part 45 is smoothed by the smoothing capacitor Cd in the regeneration mode of the rotary motor 20. Moreover, the MOS-FETs 43a and 43b are alternately conducted by the switching signal alternately supplied to the gates of the MOS-FETs 43a and 43b from the control module 51. Thus, the direct current smoothed by the smoothing capacitor Cd is stepped down according to a duty ratio of turning on and off the MOS-FETs 43a and 43b. Specifically, the direct current is converted (stepped down) into a direct current that meets standards of the battery Batt. In other words, in the step-up converter part 43, the half-wave rectified current from the inverter part 45 is smoothed, stepped down and then outputted to the battery Batt. Therefore, the step-up converter part 43 functions as a reversible power converter (DC-DC) on the battery Batt side.

Note that reference numeral Vs in FIG. 2 denotes a voltage sensor, and Is, Iu and Iw denote current sensors. The voltage sensor Vs and the current sensor Is measure a direct current voltage and a direct current, which are stepped up in the step-up converter part 43, in the power running mode of the rotary motor 20. The measured direct current voltage and direct current are fed into the control module 51 and used for output management of the rotary motor 20.

In the regeneration mode of the rotary motor 20, the current sensors Iu and Iw measure U-phase and W-phase currents, respectively, of the three-phase alternating currents before half-wave rectification in the inverter part 45. The measured three-phase alternating currents are fed into the control module 51. Moreover, in the regeneration mode of the rotary motor 20, potentials of the U-phase and W-phase of the three-phase alternating currents before half-wave rectification in the inverter part 45 are directly fed into the control module 51 without using sensors. The potentials and currents of the respective phases of the three-phase alternating currents, which are fed into the control module 51, are used for charge management of the battery Batt by regenerative power.

Moreover, in FIG. 2, reference numeral 39a denotes a heat sink and reference numerals 47a and 47b denote temperature sensors, respectively. The heat sink 39a is fixed to a surface of the board 39, the surface being opposite to a surface on which the driver 41 is mounted. The heat sink 39a releases heat generated by the MOS-FETs 43a, 43b and 45a to 45f in the driver 41 into the engine room R. The temperature sensor (equivalent to an internal temperature detector in claims) 47a is disposed proximal to one of the MOS-FETs 45a to 45f in the inverter part 45. The temperature sensor 47a detects a temperature of a portion of the driver 41 that has a highest temperature, in other words, a driver temperature. The other temperature sensor (equivalent to an ambient temperature detector in claims) 47b is disposed proximal to the heat sink 39a. The temperature sensor 47b detects a temperature in the engine room R in which the heat sink 39a is exposed, in other words, an ambient temperature. Measured signals from the temperature sensors 47a and 47b are inputted to the control module 51.

The control module 51 is mounted on the board 39 together with the driver 41. In this embodiment, the control module 51 includes two ICs (integrated circuits), which are a driver IC 53 and a control IC (control section) 55.

The driver IC 53 is operated by power supplied from the battery Batt and includes an oscillation circuit and an A/D converter. In response to a control signal from the control IC 55, the driver IC 53 thus configured outputs a switching signal at a predetermined timing to each of the MOS-FETs 43a, 43b and 45a to 45f in the driver 41. Moreover, the driver IC 53 outputs, to the control IC 55, measured signals from the voltage sensor Vs and the current sensors Is, Iu and Iw in the driver 41 and from the temperature sensors 47a and 47b as well as the potentials of the U-phase and W-phase of the three-phase alternating current in the regeneration mode of the rotary motor 20 after subjecting those described above to digital conversion.

The control IC 55 is operated by the power supplied from the battery Batt through the driver IC 53. As shown in a block diagram of FIG. 3, the control IC 55 includes a CPU 55a, a RAM 55b and a ROM 55c.

Figure 3:
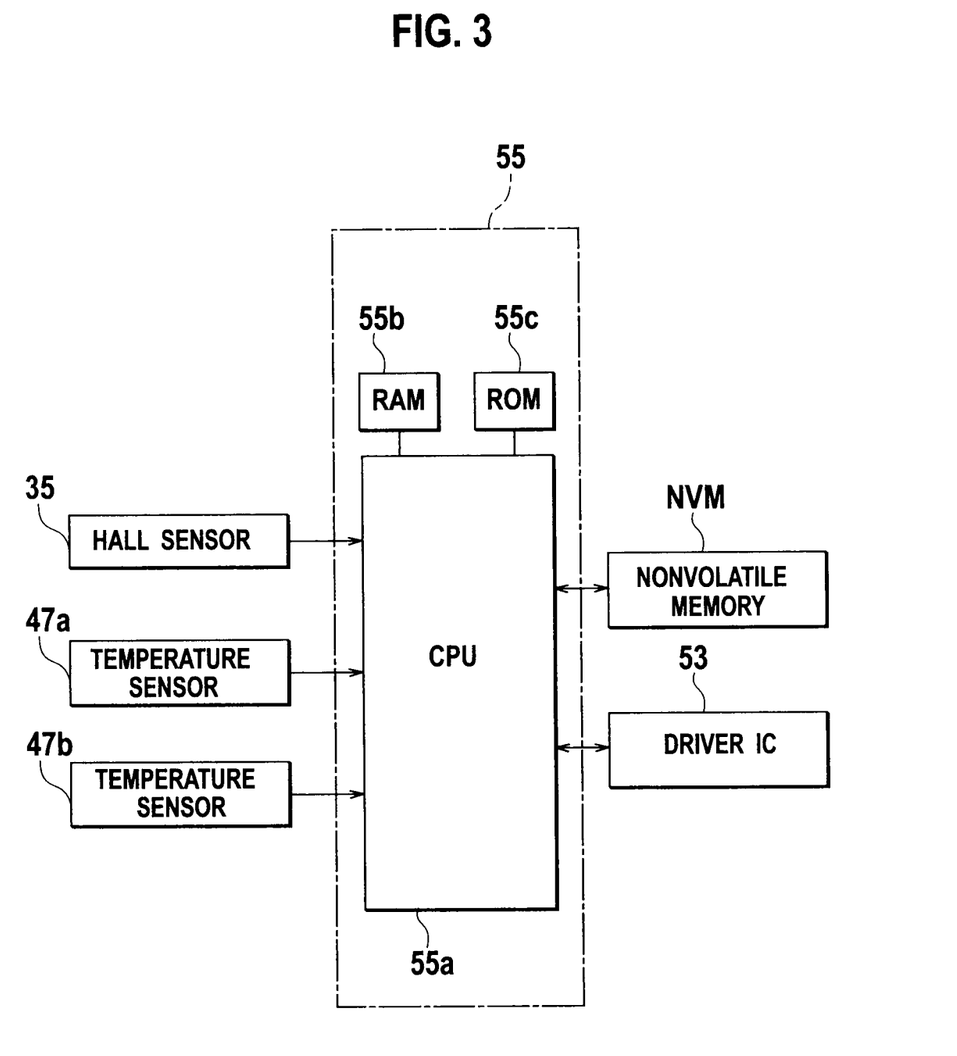
FIG. 3 is a block diagram showing a schematic electrical configuration of a control IC shown in FIG. 2.

Besides the RAM 55b and the ROM 55c, the driver IC 53, the hall sensor 35, the temperature sensors 47a and 47b and a nonvolatile memory NVM are connected to the CPU 55a. The RAM 55b has a data area for storing various data and a work area used for various processing operations. The ROM 55c stores a control program for allowing the CPU 55a to execute the various processing operations.

The nonvolatile memory NVM stores an output conversion table and an output limiting table. The output conversion table is a table for calculating an output current to be supplied to the rotary motor 20 in order to obtain an output required to generate an assist amount of the rotary motor 20, the assist amount being required to obtain a boost pressure corresponding to a state of the engine E1 and an accelerator opening, from data on the assist amount notified to the control IC 55 from an electronic control unit disposed proximal to the engine E1 through a CAN. Incidentally, the output conversion table may be replaced with a conversion formula for calculating the output current to be supplied to the rotary motor 20 from the data on the assist amount from the electronic control unit. Moreover, the output limiting table is for determining the upper limit output current of the rotary motor 20 according to the contents of the driver temperature and the ambient temperature, which are measured by the temperature sensors 47a and 47b, respectively.

Here, with reference to an explanatory diagram of FIG. 4, description will be given of the output limiting table stored in the nonvolatile memory NVM. First, in this embodiment, upper limit temperatures are individually set as thresholds for the driver temperature and the ambient temperature. These thresholds, in other words, the upper limit temperatures can be determined according to the engine E1, the rotary motor 20, specifications of the circuit elements of the driver 41, a structure of the engine room R, and the like. Note that the upper limit temperature of the driver temperature, that is, an upper limit internal temperature is set to 150° C. in this embodiment. Moreover, the upper limit temperature of the ambient temperature, that is, an upper limit ambient temperature is set to 125° C. in this embodiment.

Figure 4:
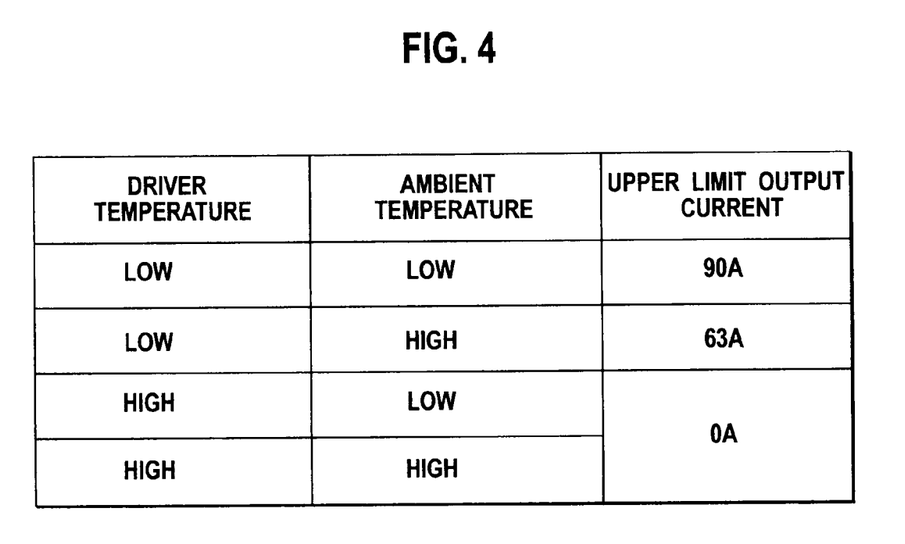
FIG. 4 is an explanatory diagram showing contents of an output limiting table stored in a nonvolatile memory shown in FIG. 3.

As shown in FIG. 4, the output limiting table stored in the nonvolatile memory NVM defines, as one of parameters, whether the driver temperature measured by the temperature sensor 47a is not less than (high) or below (low) the upper limit internal temperature. Moreover, the output limiting table also defines, as one of the parameters, whether the ambient temperature measured by the temperature sensor 47b is not less than (high) or below (low) the upper limit ambient temperature.

In the output limiting table stored in the nonvolatile memory NVM, upper limit output current values of the rotary motor 20 are associated with combinations of states of the driver temperature and the ambient temperature, the states indicating that the temperatures are higher or lower than the upper limit temperatures corresponding thereto, respectively. Note that the values of the upper limit internal temperature and the upper limit ambient temperature are both stored in the nonvolatile memory NVM together with the output limiting table.

To be more specific, when the driver temperature is "higher" than the upper limit internal temperature, the upper limit output current is set to "0 A (ampere)" regardless of whether the ambient temperature is "higher" or "lower" than the upper limit ambient temperature. Specifically, drive of the rotary motor 20 is stopped.

On the other hand, when the driver temperature is "lower" than the upper limit internal temperature, the upper limit output current is limited to "63 A (amperes)" if the ambient temperature is "higher" than the upper limit ambient temperature. Moreover, the upper limit output current is allowed up to "90 A (amperes)" that is a rated current of the rotary motor 20 if the ambient temperature is "lower" than the upper limit ambient temperature. Specifically, the rotary motor 20 can be driven at 100% output.

Note that, as shown in FIGS. 2 and 3, the control IC 55 is connected to a CAN (Controller Area Network) that is a type of in-vehicle LANs. Moreover, a plurality of unillustrated electronic control units (ECU) installed in the vehicle are network-connected to the CAN.

Among the plurality of network-connected electronic control units, the electronic control unit disposed proximal to the engine E1 performs control such as setting a boost pressure of the turbocharger 1 according to the accelerator opening as well as a fuel injection amount and a fuel injection timing in an unillustrated fuel injection device of the engine E1. Therefore, the assist amount of the rotary motor 20 required to obtain the boost pressure corresponding to the state of the engine E1 and the accelerator opening is determined by the electronic control unit disposed proximal to the engine E1 and then is notified to the control IC 55 by the data inputted through the CAN.

Next, with reference to flowcharts of FIGS. 5 and 6, description will be given of control performed by the CPU 55a in the control IC 55 according to the control program stored in the ROM 55c, particularly, control of operations of the rotary motor 20.

Figure 5:
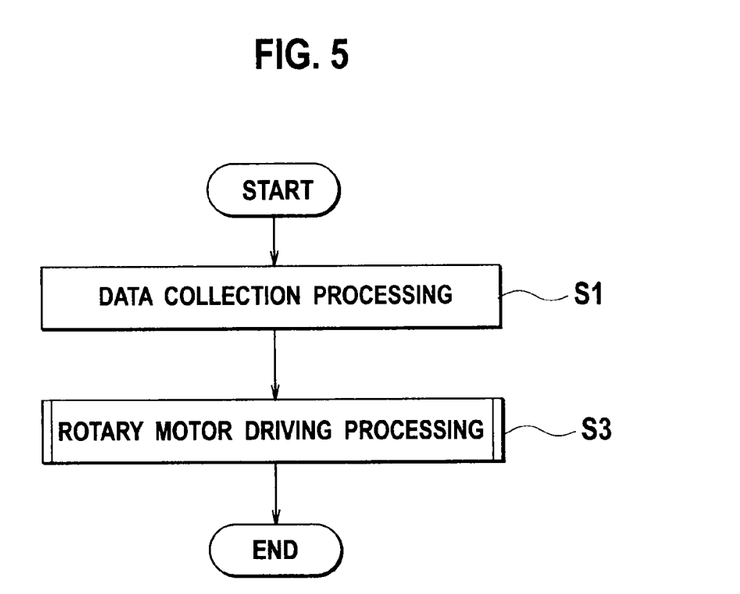
FIG. 5 is a flowchart of a main routine performed by a CPU in the control IC shown in FIG. 3 according to a control program stored in a ROM, particularly showing control of operations of the rotary motor.

When power feeding from the battery Batt is started and the control IC 55 is activated, the CPU 55a repeatedly and periodically executes data collection processing (Step S1) of collecting data from each of the electronic control units through the CAN and rotary motor driving processing (Step S3) of controlling drive of the rotary motor 20, as shown in the flowchart of FIG. 5 showing a main routine.

In the data collection processing of Step S1, data on an assist amount of the rotary motor 20 is retrieved, the assist amount being required to obtain a boost pressure corresponding to a state of the engine E1 and an accelerator opening. Specifically, the data is notified from the electronic control unit disposed proximal to the engine E1 through the CAN.

Figure 6:
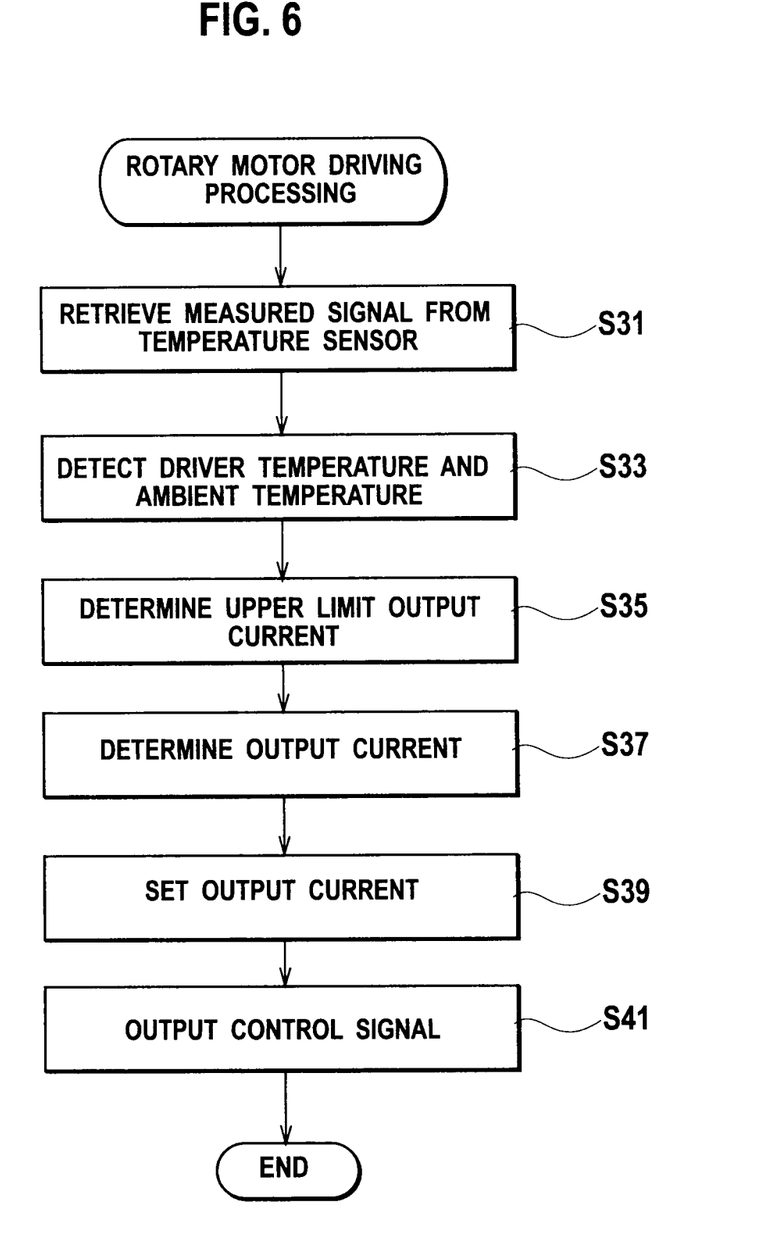
FIG. 6 is a flowchart of a subroutine showing processing of driving the rotary motor shown in FIG. 5.

Moreover, in the rotary motor driving processing of Step S3, as shown in the flowchart of FIG. 6 showing a subroutine, first, measured signals from the temperature sensors 47a and 47b are retrieved (Step S31). Thereafter, from the measured signals retrieved, detected are: a temperature of a proximal portion of one of the MOS-FETs 45a to 45f in the inverter part 45 of the driver 41, the portion having a highest temperature, in other words, a driver temperature; and a temperature in the engine room R, in other words, an ambient temperature (Step S33).

Next, the detected driver temperature and ambient temperature are checked against the values of the upper limit internal temperature and upper limit ambient temperature in the nonvolatile memory NVM and the output limiting table stored in the nonvolatile memory NVM to determine an upper limit output current of the rotary motor 20 (Step S35). In this event, when the detected driver temperature is equal to or above the upper limit internal temperature ("High" state), "0 A (ampere)" is determined, without exception, as the upper limit output current of the rotary motor 20 regardless of the value of the ambient temperature detected. Moreover, when the detected driver temperature is below the upper limit internal temperature ("Low" state), "63 A (amperes)" is determined as the upper limit output current of the rotary motor 20 if the detected ambient temperature is equal to or above the upper limit ambient temperature ("High" state). On the other hand, if the detected ambient temperature is below the upper limit ambient temperature ("Low" state), "90 A (amperes)" is determined as the upper limit output current of the rotary motor 20.

Subsequently, based on the assist amount of the rotary motor 20 indicated by the data retrieved in the data collection processing of Step S1, an output current to be normally supplied to the rotary motor 20 is determined by referring to the output conversion table in the nonvolatile memory NVM (Step S37). Thereafter, the determined output current is compared with the upper limit output current of the rotary motor 20 that is determined in Step S35, thereby determining an output current to be actually supplied to the rotary motor 20 (Step S39). Subsequently, a control signal for notifying the determined output current is outputted to the driver IC 53 (Step S41). After the control signal is outputted, the rotary motor driving processing shown in FIG. 6 is terminated and then the processing returns to the main routine shown in FIG. 5.

Incidentally, in Step S39, when the output current determined in Step S37 is equal to or less than the upper limit output current determined in Step S35, the output current determined in Step S37 is determined as the output current to be actually supplied to the rotary motor 20. On the other hand, when the output current determined in Step S37 exceeds the upper limit output current determined in Step S35, the upper limit output current determined in Step S35 is determined as the output current to be actually supplied to the rotary motor 20.

Note that the driver IC 53 that has retrieved the control signal outputted from the control IC 55 in Step S41 of FIG. 6 determines a duty ratio of a switching signal alternately supplied to the gates of the MOS-FETs 43a and 43b in the step-up converter part 43 according to the output current notified by the control signal. Thus, the output current having the same value as that notified by the control signal outputted from the control IC 55 is supplied to the rotary motor 20 through the inverter part 45.

As is clear from the above description, in this embodiment, the driver 41 and the driver IC 53 are set to be the elements corresponding to a drive unit in claims. In this embodiment, a combination of the driver 41 and the driver IC 53 is defined as the "drive unit". Moreover, in this embodiment, Steps S35 and S39 in the flowchart of FIG. 6 are set to be the processing corresponding to control means in claims. Furthermore, in this embodiment, the control IC 55 and the temperature sensors 47a and 47b are set to be the elements corresponding to a control device in claims.

In the turbocharger 1 thus configured, the high temperature and pressure exhaust gas G3 discharged to the exhaust pipe B from the engine E1 is sprayed onto the blade 17 of the turbine impeller 15 through between the variable vanes 19, 19, . . . inside the turbine housing 10. Then the turbine disk 16 is rotated together with the rotating shaft member 5 by the energy of the exhaust gas G3 sprayed onto the blade 17.

When the rotating shaft member 5 is rotated together with the turbine disk 16, the compressor disk 12 of the compressor 7 is rotated together therewith. Accordingly, the combustion air G1 passing through the intake pipe A is compressed (boosted) by the blade 13 of the compressor impeller 11 inside the compressor housing 8. The combustion air G1 is then supercharged to the engine E1 and used for combustion of the fuel inside a cylinder of the engine E1.

Note that, in the turbocharger 1 described above, when the rotation speed of the engine E1 is low, such as at startup of the vehicle and during running of the vehicle in a low speed range of the engine E1, the energy of the exhaust gas G3 sprayed onto the blade 17 of the turbine impeller 15 is insufficient.

Thus, the turbine disk 16 is not rotated at a sufficient rotation speed. Then the rotation speed of the compressor disk 12 of the compressor 7 connected to the turbine disk 16 through the rotating shaft member 5 is not increased. Thus, compression (boosting) of the combustion air G1 by the blade 13 of the compressor impeller 11 is not sufficiently performed.

To solve the above problem, when the rotation speed of the engine E1 is low, a signal outputted by the control module 51 activates the stepping motor 19a to adjust the angles of the variable vanes 19. Thus, the interval between the adjacent variable vanes 19 and 19 is narrowed. Accordingly, a throttling effect of the exhaust gas G3 passing between the adjacent variable vanes 19 and 19 is increased and thus a spraying speed of the exhaust gas G3 onto the blade 17 of the turbine impeller 15 is increased. Consequently, the rotation speed of the turbine disk 16 is increased and the rotation speed of the compressor disk 12 of the compressor 7 is also increased. Thus, a boost pressure of the combustion air G1 compressed by the blade 13 of the compressor impeller 11 is increased.

When the rotation speed of the engine E1 is low and thus the boost pressure of the combustion air G1 is insufficient, the assist amount of the rotary motor 20 required to obtain the boost pressure corresponding to the state of the engine E1 and the accelerator opening is determined by the electronic control unit disposed proximal to the engine E1 based on a boost pressure or the like detected by an unillustrated boost pressure sensor provided in a portion of the intake pipe A closer to the engine E1 than the compressor 7.

By the control performed by the control IC 55 to which the determined assist amount is notified, the rotary motor 20 is driven as the motor through the driver IC 53 and the driver 41. In this event, when a temperature of a portion of the driver 41 that has a highest temperature, in other words, a driver temperature and a temperature in the engine room R in which the heat sink 39a is exposed, in other words, an ambient temperature are both below an upper limit internal temperature and an upper limit ambient temperature, which are, respectively, upper limit temperatures thereof, the output current of the rotary motor 20 is not limited. Thus, the rotary motor 20 is driven as the motor with the assist amount of the rotary motor 20 required to obtain the boost pressure corresponding to the state of the engine E1 and the accelerator opening.

Moreover, even when the ambient temperature rises up to the upper limit ambient temperature, the drive of the rotary motor 20 as the motor is continued as long as the driver temperature is below the upper limit internal temperature. However, the upper limit output current of the rotary motor 20 in this event is limited to "63 A (amperes)", which is lower than "90 A (amperes)" that is the rated current. This is in order to prevent an increase in the driver temperature up to the upper limit internal temperature due to the output current of the rotary motor 20 flowing through the MOS-FETs 43a, 43b and 45a to 45f in the driver 41.

Therefore, when the assist amount of the rotary motor 20 required to obtain the boost pressure corresponding to the state of the engine E1 and the accelerator opening requires the output current of over "63 A (amperes)", an actual assist amount of the rotary motor 20 is small since the rotary motor 20 is actually driven as the motor only with the output current of "63 A (amperes)". However, this does not mean that the drive of the rotary motor 20 as the motor is stopped. Thus, insufficient boost pressure of the combustion air G1 in the turbocharger 1 is somewhat reduced.

Meanwhile, when the driver temperature rises up to the upper limit internal temperature, even if the ambient temperature is below the upper limit ambient temperature, the drive of the rotary motor 20 as the motor is forcibly stopped. The drive of the rotary motor 20 stopped as the motor is then restarted when the driver temperature drops below the upper limit internal temperature. As described above, the upper limit output current of the rotary motor 20 after the restart varies depending on whether or not the ambient temperature has reached the upper limit ambient temperature.

As described above, according to this embodiment, in driving the rotary motor 20 directly connected to the rotating shaft member 5 of the turbocharger 1 as the motor by the driver 41, even when the temperature in the engine room R in which the heat sink 39a is exposed, in other words, the ambient temperature detected by the temperature sensor 47b rises up to the upper limit temperature of the ambient temperature, that is, the upper limit ambient temperature, if the temperature of the portion of the driver 41 that has the highest temperature, in other words, the driver temperature detected by the temperature sensor 47a has not yet risen to the upper limit temperature of the driver temperature, that is, the upper limit internal temperature, the drive of the rotary motor 20 as the motor is continued while lowering the upper limit of the output current.

Thus, the circuit elements such as the MOS-FETs 43a, 43b and 45a to 45f whose heat resistance is particularly emphasized in the driver 41 can be protected from an abnormal rise in the driver temperature detected by the temperature sensor 47a mounted on the board 39 and disposed proximal thereto. At the same time, overprotection of the circuit elements from the temperature rise in the engine room R, which is not as significant as the abnormal rise in the driver temperature, can be prevented.

Thus, thermal protection of the circuit elements such as the MOS-FETs 43a, 43b and 45a to 45f in the driver 41 can be appropriately performed while trying as much as possible not to interfere with electric assistance of the turbocharger 1 by the drive of the rotary motor 20 as the motor by continuing the drive of the rotary motor 20 as much as possible.

Note that, in this embodiment, the temperature of the portion of the driver 41 that has the highest temperature, more specifically, the temperature proximal to one of the MOS-FETs 45a to 45f in the inverter part 45 is detected as the temperature of the drive unit, that is, the driver temperature by the temperature sensor 47a. However, the position to measure the driver temperature is not limited to that proximal to the MOS-FETs 45a to 45f in the inverter part 45. For example, the position may be proximal to the MOS-FETs 43a and 43b in the step-up converter part 43, proximal to the smoothing capacitor Cd and the step-up coil L or proximal to the control IC 55 in the control module 51.

When the temperature at a position proximal to the MOS-FETs 43a and 43b in the step-up converter part 43 or the step-up coil L is detected as the driver temperature, the temperature of the portion of the driver 41 that has the highest temperature is detected as a result as in the case of this embodiment. Thus, the circuit elements such as the MOS-FETs 43a, 43b and 45a to 45f whose heat resistance is emphasized can be protected from an abnormal temperature rise. Moreover, when the temperature at a position proximal to the smoothing capacitor Cd is detected as the driver temperature, thermal protection, by the smoothing capacitor Cd, on the circuit elements such as the MOS-FETs 43a, 43b and 45a to 45f whose heat resistance is emphasized can be monitored so as not to be impaired. Furthermore, when the temperature at a position proximal to the control IC 55 in the control module 51 is detected as the driver temperature, the MOS-FETs 43a, 43b and 45a to 45f can be prevented from being broken down by erroneous control of the MOS-FETs 43a, 43b and 45a to 45f due to overdrive of the control IC 55.

Moreover, in this embodiment, as the temperature in the space in which the drive unit is disposed, that is, the ambient temperature, the temperature at a position proximal to the heat sink 39a exposed in the engine room R is detected by the temperature sensor 47b. However, the position to measure the ambient temperature is not limited to that proximal to the heat sink 39a. For example, the position may be proximal to the housing 3 of the turbocharger 1 exposed in the engine room R just like the heat sink 39a.

When the position to detect the driver temperature or the ambient temperature is changed from the position described in this embodiment, the upper limit internal temperature and the upper limit ambient temperature are set according to an environment of the position after the change.

Furthermore, in this embodiment, the upper limit output current in the case where the driver temperature is "lower" than the upper limit internal temperature and the ambient temperature is "higher" than the upper limit ambient temperature is set to "63 A (amperes)". However, the upper limit output current in this case is not limited to 63 A but may be set to any value above 0 A and below 90 A.

Incidentally, in this embodiment, the description has been given of the case where the upper limit output current of the rotary motor 20 is limited to the value lower than "90 A (amperes)" that is the rated current depending on the pattern of the upper limit temperatures (the upper limit internal temperature and the upper limit ambient temperature) of the driver temperature and the ambient temperature. However, a factor that serves as an index to limit the upper limit output current of the rotary motor 20 may be a temperature of another heat source that emits intense heat or a temperature thereabound.

For example, when a temperature of the stator 23, which is likely to be high, in the rotary motor 20 is detected and this stator temperature is above a predetermined reference temperature, a conduction current value for the stator 23 in the rotary motor 20, the value being requested to the driver 41, in other words, a current command value can be limited to a value lower than "90 A (amperes)" that is the rated current of the rotary motor 20.

In this case, limitation on the current command value can also be gradually increased according to an excess quantity with respect to the reference temperature of the stator temperature. Specifically, as shown in a graph of FIG. 7, for example, an upper limit of a current command value (effective value) shown in the vertical axis can also be gradually lowered according to an excess quantity with respect to the reference temperature of the stator temperature shown in the horizontal axis. Note that the value of the reference temperature can be arbitrarily set according to the specifications of the rotary motor 20 and other configurations and circumstances. However, in the case shown in the graph of FIG. 7, the reference temperature is set to 155° C.

Figure 7:
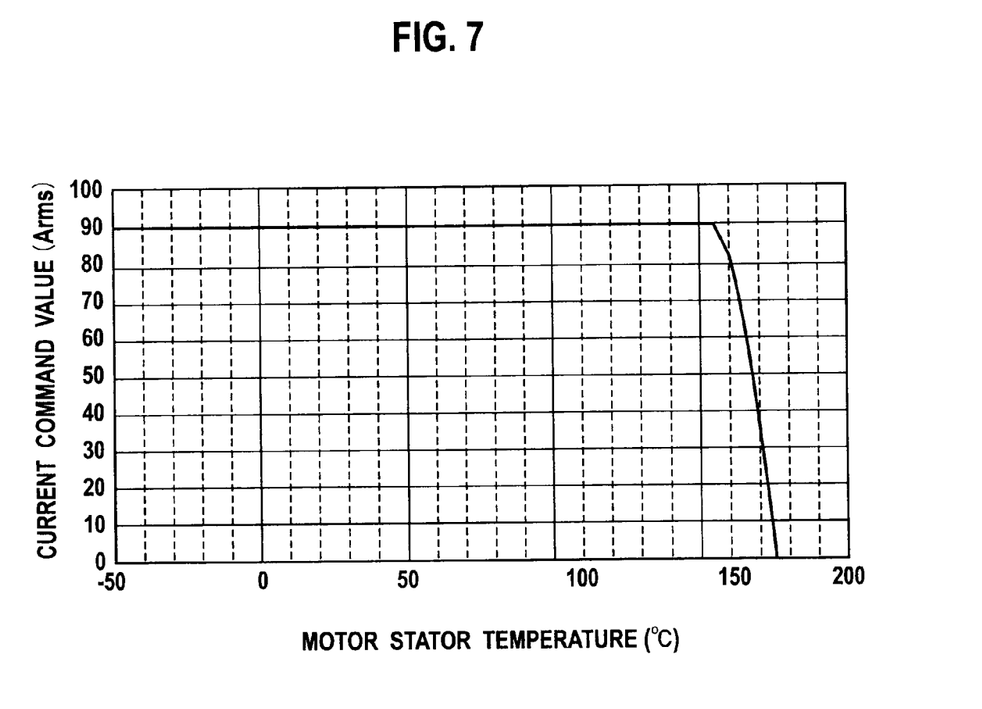
FIG. 7 is a graph showing an example of limiting characteristics in the case where an upper limit output current (current command value) of the rotary motor shown in FIG. 1 is limited according to a stator temperature.

By limiting the upper limit output current (current command value) of the rotary motor 20 as described above, even when the stator temperature has reached the reference temperature, the output of the rotary motor 20 is not drastically reduced by limiting the upper limit output current. Specifically, the upper limit output current is gradually reduced according to the rise in the stator temperature after reaching the reference temperature. Thus, the output of the rotary motor 20 is gradually lowered.

Thus, even when the stator temperature exceeds the reference temperature and the output current of the rotary motor 20 is limited, occurrence of a stepped output of the rotary motor 20 can be prevented. Moreover, since the stator temperature is lowered by reduction in the output of the rotary motor 20 due to the limitation of the output current, the drive of the rotary motor 20 can be continued in a state where the stator temperature does not substantially exceed the limit temperature in a normal operation of the rotary motor 20.

Consequently, even in a high temperature zone where the stator temperature exceeds the reference temperature, the rotary motor 20 can be stably used without exceeding the limit temperature. As a result, operability and reliability of the electric assistance of the turbocharger 1 can be improved.

Note that the stator temperature is ideally measured at the spot closest to the rotor 21 on the stator 23 but may be measured at a spot on the side of a stator coil, and the like. Moreover, for measurement of the stator temperature, a resistance-temperature detector, a thermocouple, a radiation thermometer or the like can be used. Moreover, the output current of the rotary motor 20 may be limited in the following manner in addition to using the method described in the above embodiment. Specifically, the output current of the rotary motor 20 may be limited in stages by using a parallel circuit of a plurality of temperature switches having different set temperatures from each other, the circuit being disposed between the stator coil and the driver 41, and by using opening and closing patterns of the temperature switches according to the stator temperature.

Moreover, in this embodiment, the description has been given by taking, as an example, the turbocharger 1 in which the vanes inside the turbine housing 10 of the turbine 9 are the variable vanes 19. However, the present invention can also be applied to a turbocharger in which all or some of the vanes inside the turbine housing are fixed vanes as long as the turbocharger is the electrically assisted type.

Furthermore, in this embodiment, the description has been given by taking, as an example, the turbocharger 1 of the engine E1 with the exhaust gas recirculation system C which recirculates the exhaust gas G3 from the exhaust pipe B to the intake pipe A. However, the present invention can also be applied to a turbocharger of an engine without the exhaust gas recirculation system C as long as the turbocharger is the electrically assisted type.

Similarly, in this embodiment, the description has been given by taking, as an example, the turbocharger 1 in which the bypass pipe 27 bypassing the turbine 9 is provided in the middle of the exhaust pipe B and the waste gate 25 and the waste gate valve 29 are provided in the middle of the bypass pipe 27. However, the present invention can also be applied to a turbocharger having no waste gate as long as the turbocharger is the electrically assisted type.

The present invention is not limited to the description of the embodiment of the invention. The present invention can be carried out in other various modes by making appropriate modifications thereto.

Note that the entire contents of Japanese Patent Application P2007-029529 (filed: Feb. 8, 2007) are incorporated herein by reference.

The invention claimed is:

1. A control device for controlling operations of a drive unit configured to drive a rotary motor for an electrically assisted turbocharger, the rotary motor being directly connected to a rotating shaft of the electrically assisted turbocharger disposed in intake and exhaust passages of an engine and being driven according to an operating state of the engine, the control device comprising:

an internal temperature detector to detect a temperature of the drive unit;

an ambient temperature detector to detect an ambient temperature in a space where the drive unit is disposed; and a control section to control drive of the rotary motor by the drive unit based on results of detections by the internal temperature detector and the ambient temperature detector, wherein (a) the control section stops the drive of the rotary motor by the drive unit while the temperature of the drive unit is equal to or above a preset upper limit internal temperature, and (b) while the temperature of the drive unit is below the upper limit internal temperature, (b1) the control section allows the drive of the rotary motor by the drive unit up to 100% output while the ambient temperature in the space where the drive unit is disposed is below a preset upper limit ambient temperature, and (b2) the control section limits the drive of the rotary motor by the drive unit to an output of a predetermined percentage above 0% and below 100% while the ambient temperature is equal to or above the upper limit ambient temperature.

2. The control device for the drive unit, according to claim 1, wherein the drive unit includes an inverter, the internal temperature detector detects a temperature of a switching element in the inverter as the temperature of the drive unit, and the upper limit internal temperature is set to an upper limit temperature at which a normal operation of the switching element is guaranteed.

* * * * *